No. 825,864. PATENTED JULY 10, 1906.
J. G. RAQUETT.
WEIGHING MACHINE.
APPLICATION FILED MAR. 19, 1906.

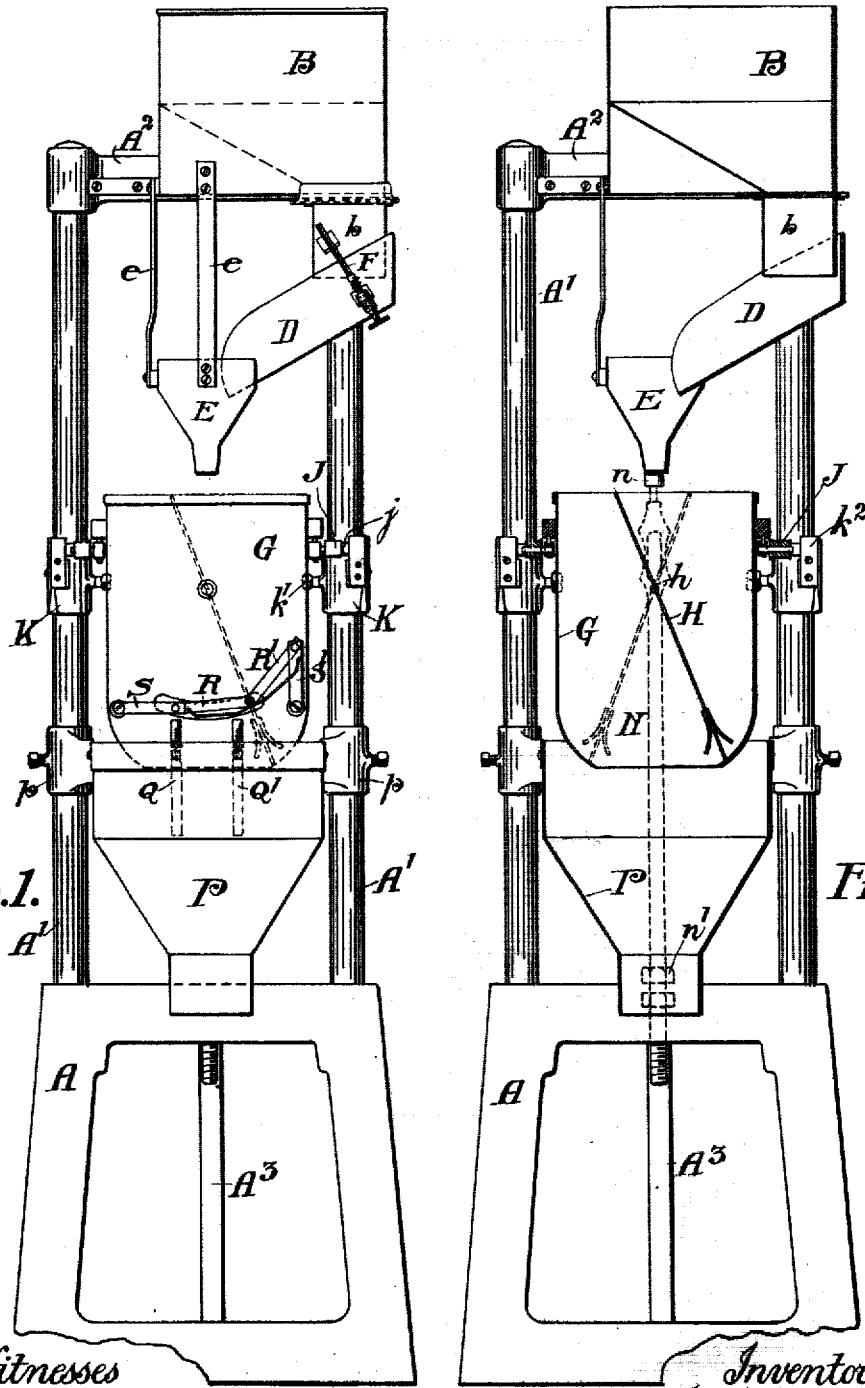

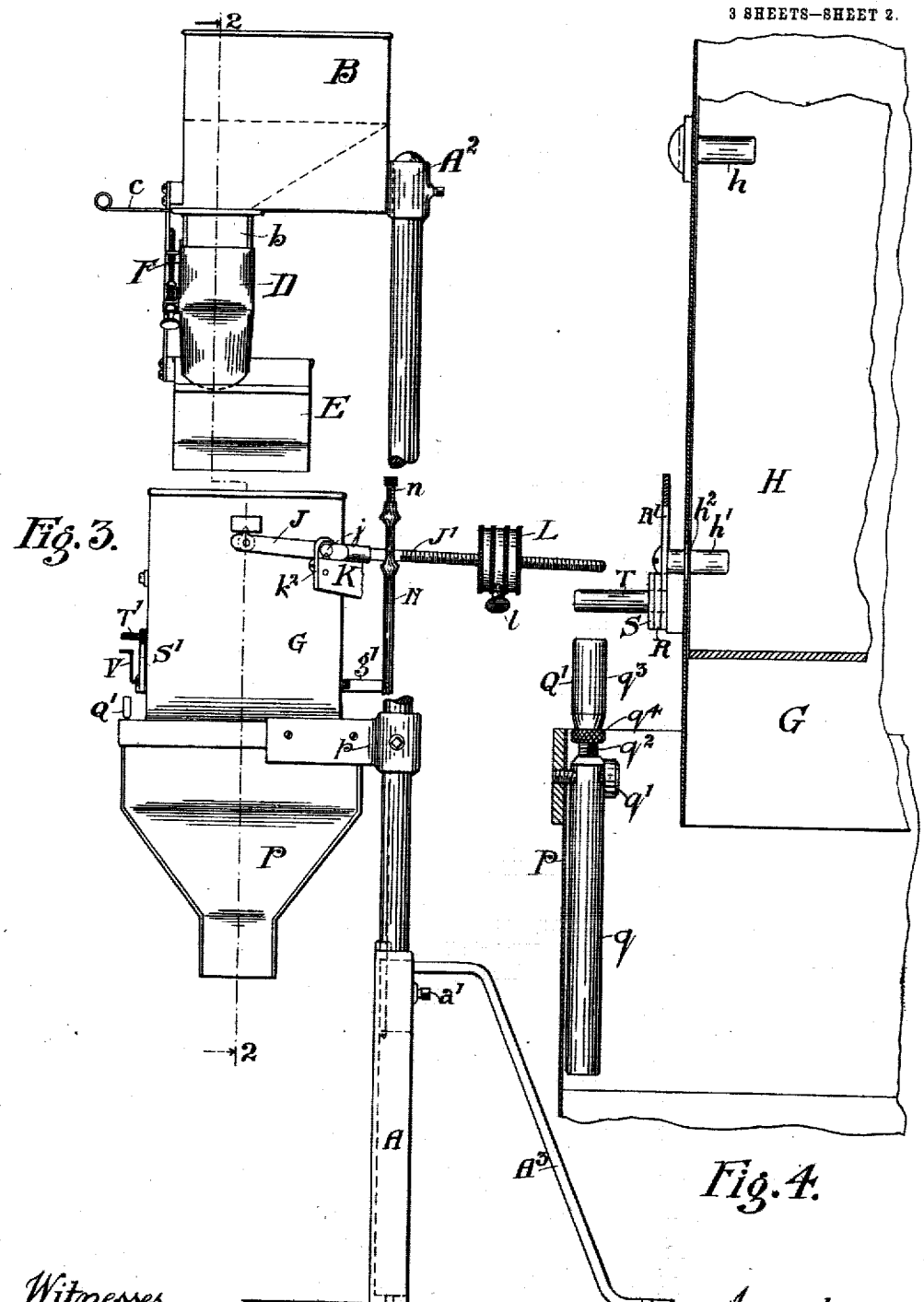

3 SHEETS—SHEET 3.

Witnesses
Inventor
Joseph G. Raquett

UNITED STATES PATENT OFFICE.

JOSEPH G. RAQUETT, OF CLEVELAND, OHIO.

WEIGHING-MACHINE.

No. 825,864. Specification of Letters Patent. Patented July 10, 1906.

Application filed March 19, 1906. Serial No. 306,714.

*To all whom it may concern:*

Be it known that I, JOSEPH G. RAQUETT, a citizen of the United States, residing at Cleveland, in the county of Cuyahoga and State of Ohio, have invented a certain new and useful Improvement in Weighing-Machines, of which the following is a full, clear, and exact description, reference being had to the accompanying drawings.

The object of this invention is to provide in a very simple and efficient form a weighing-machine which will receive a continuous flow of material and periodically and automatically discharge definite weights thereof.

The invention is adapted for a variety of uses and may be embodied in large or small machines, as desired.

The invention consists of the combination of parts coöperating to produce the automatic weighing and discharging, as hereinafter more fully explained and as definitely set out in the claims.

The drawings are illustrations of my invention and show it embodied in a machine which practice has demonstrated to be efficient in weighing and separating material into comparatively small packages—as, for example, coffee separated into pounds.

Figure 5:
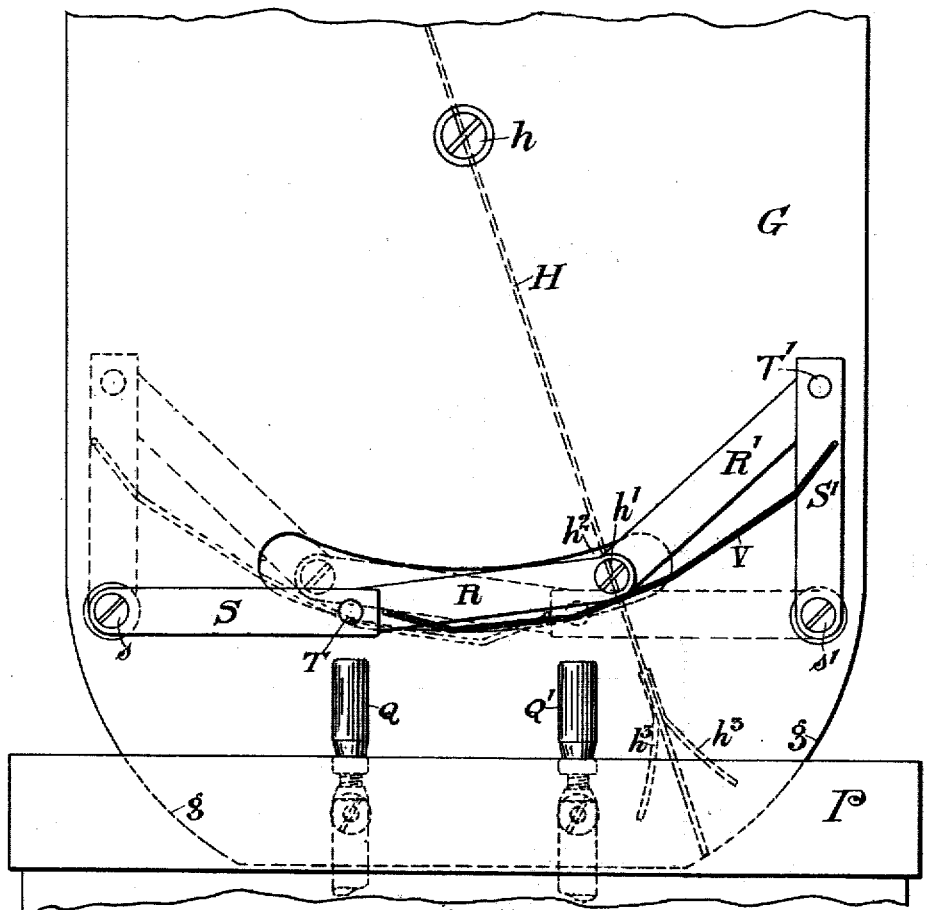
Figure 6:
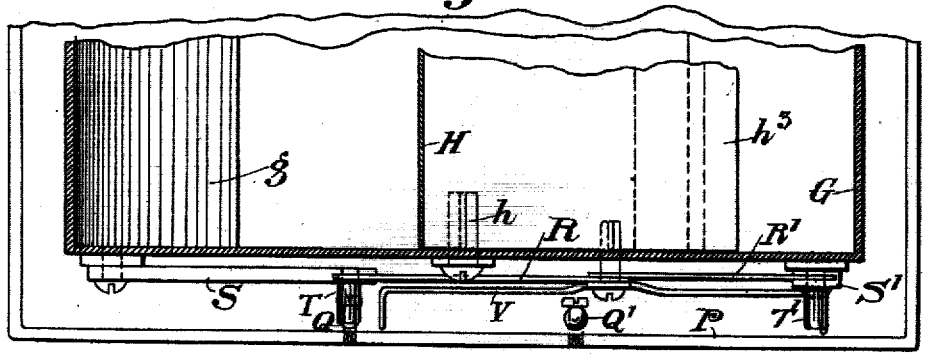

Figure 1 is a front elevation of such embodiment of the invention. Fig. 2 is a section of the same in planes parallel with Fig. 1, being substantially on the line 2 2 of Fig. 3. Fig. 3 is a side elevation, the support being partly broken away. Fig. 4 is an enlarged cross-section through the weighing-receptacle and the releasing mechanism. Fig. 5 is an enlarged front view of the weighing-receptacle, and Fig. 6 is a horizontal section of the same.

Referring by reference-letters to the machine as shown in the drawings, A represents a base from which rises a pair of supporting-posts A'. These posts are connected by a cross-bar A² at their upper ends. A brace A³ is shown as secured to the base A, the base and this brace being adapted to be secured to a similar support. The parts mentioned constitute the frame of the weighing-machine.

Mounted on the cross-bar A² is a receiving-hopper B, which has a discharge-leg b. A gate C is adapted to extend across this leg. The gate has an opening through a portion of its surface, wherefore when it is drawn out, as shown in Fig. 3, the hopper is opened, while when the gate is shoved in the hopper is closed. Beneath the hopper-leg b is an adjustable chute D, resting near its discharge end on the spout E. The spout is carried by straps e, depending from the receiving-hopper B. The upper end of the chute D is carried by a rotatable screw F, operating in bearings on the side of the chute and the side of the hopper-leg b. The rotation of this screw raises or lowers the upper end of the chute D, thereby changing the angle of its bottom and varying the speed with which the material passes to the spout E. A set-nut holds the parts in adjusted positions.

The spout E is shown with its ends vertical, while its sides are tapered inwardly and downwardly, so that the material is discharged centrally in a comparatively flat stream. Directly beneath this spout is the weighing-receptacle G, which contains a pivoted plate or diaphragm H, adapted to be held, as hereinafter explained, with its lower end in engagement with one side or the other of the receptacle, whereby there are formed alternate receiving-chambers for the material. The pivot h of the plate H is intermediate of the ends of this plate, so that the upper end is swung to extend beyond the mouth of the spout E in whichever position the plate occupies, one position being shown in full lines in Fig. 2 and the other in dotted lines.

The weighing-receptacle is freely supported on upwardly-projecting points carried by arms J, which are brought together at the rear of the receptacle, forming a fork, and extending rearward from their junction in the bar J'. The fork-arms have trunnions j, which are mounted on points extending upward from brackets K, which are supported by the rods A', these brackets having sleeves surrounding the rods and adjustably clamped thereto by set-screws k'. Straps k, carried by the brackets, extend loosely over the trunnions j and prevent displacement thereof.

A screw-thread is formed on the rearwardly-projecting bar J', and on this thread is mounted a counterweight L. By rotating this weight it is caused to travel in or out, and it may be clamped in any desired position by a clamping-nut l. The weight is so placed that it will counterbalance the weight of the receptacle G and its attached parts and substantially the load to be weighed and discharged. When the receptacle has received enough material to counterbalance the weight, the receptacle moves downwardly a short distance, operating the releasing mechanism, to be hereinafter described. The amount of downward movement is controlled by the set-screw n, carried in the standard N, which loosely yokes around the bar J'. The receptacle G is steadied by a link q', pivoted to it and to the standard N.

Below the receptacle G is the discharging-hopper P, adjustably supported by sleeves p, surrounding the standards A'. This discharging-hopper receives the weighed material from the receptacle G and discharges it into a bag or other device which may be provided beneath it to receive the material. Pivoted on the forward side of the discharging-hopper are a pair of posts Q and Q', so formed that they tend normally to stand vertically. The plate H within the weighing-receptacle is connected with a stud $h'$, extending through a slot $h^2$ in the front plate of the receptacle. Pivoted on this stud are a pair of links R R', whose other ends are pivoted to links S and S', respectively, which latter links are pivoted at their other ends to the front plate of the receptacle, as shown at $s$ and $s'$. These links constitute two toggles, being so proportioned that when the plate H is in either extreme position one of the toggles is straightened. Thus with the plate H in its right-hand position the links R and S are approximately continuous, their pivot T being slightly below the line connecting the pivot $s$ and $h'$. When these links R and S are in this position, the link S' is upright and the link R' is diagonal, as shown in the full lines in Fig. 5. When the plate H is in its left-hand position, the links R' and S' are straightened and the links R and S doubled, as shown in dotted lines in Fig. 5.

The pivot-pin T, connecting the links R and S, and the pivot-pin T', connecting the links R' and S', extend forward from these links. When the arms are straightened, the pivot-pin connecting them (T in Fig. 5) stands directly over the corresponding post, as Q. When the weighing-receptacle has received sufficient material to cause it to descend, the pin T or T' engages the upper end of the corresponding post. This movement forces the knuckle of the toggle upward, buckling the toggle and releasing the plate, allowing it to swing down, due to the weight of the material on its upper side. This movement of the plate continues by momentum until it has come to its other extreme position, the other toggle thus straightening and holding the plate in its new extreme position.

In the swinging movement of the plate a double-ended hook V, carried by the pin $h'$, engages the post beneath the pin of the now straightening toggle and pulls that post to one side, allowing the toggle to straighten with its pin directly over the position which the post normally occupies. With the discharge of the load from the receptacle the counterweight L raises the receptacle, and this causes the hook V to slide off of the post, allowing it to assume its normal position by gravity directly under the releasing-pin.

As the material is being fed continuously from the receiving-hopper through the spout E, it is necessary that the weight L be adjusted so that the weighing-receptacle descends before it has quite received its full load, since this load is slightly augmented during the descent of the receptacle and the discharge of the load. To compensate for any inequality in the two receiving-chambers in the receptacle, I make the posts Q and Q' adjustable, so that either may be set to cause the discharge quicker than the other, such quicker discharge reducing the amount the load is augmented by the flow after the receptacle has begun to descend. To provide for the adjustment of the posts and to conveniently counterweight them to keep them normally in their proper position, I make each post simply a straight rod $q$ of metal, pivoted at $q'$ near its upper end and having extending above its pivot a screw-threaded portion $q^2$. On this portion screws a head $q^3$, which may be locked by a jam-nut $q^4$.

The lower end of the receptacle G is curved inward, as shown by $g$, and the lower edge of the plate H is adapted to substantially contact with this curve. To prevent the material from catching on this lower edge and interfering with the plate coming into final position as it swings, I provide a pair of guards $h^3$, secured to opposite sides of the plate near its lower end. These guards have their edges preferably such distances from the wall of the receptacle as will allow the passage of only a few grains of the material to be weighed. There is space for anything passing this edge between the wing $h^3$ and the plate proper, while the distance between the edge of the wing and the receptacle is such that it is impossible for one of the grains of material by being across the end of the wing to interfere with the closing movement of the plate. These wings also by adding weight to the lower end of the plate assist its pendulum action as it swings by momentum.

The machine, as shown, is adjustable to bring the discharging-hopper the desired distance above the counter or support. The supporting-rods A' are adjustably clamped in the base-standard A by the set-screws $a'$, whereby the whole superstructure may be raised or lowered on the base. The rod N is screw-threaded at its lower end and is clamped to the base by nuts $n'$ on such threads, whereby this rod may be raised or lowered, as desired. The cross-bar $A^2$, which carries the receiving-hopper, its chute, and the spout E, is likewise adjustable on the rods, as are also the sleeves K, which support the weighing-receptacle, and the sleeves p, which support the discharging-hopper. The parts may thus be set to whatever way best adapts them to the use to which the machine is to be put.

After the frame parts of the machine are properly positioned the counterweight L is set to counterbalance the desired load to be weighed and discharged. A quantity of the material is then put into the receiving-hopper B and run through the machine and weighed and the counterweight readjusted accordingly. The chute D may also be adjusted to vary the speed of the flow. A few trials and readjustments will result in the chute and counterweight being properly positioned to give exactly the right weight on at least one side of the weighing-receptacle. If the amount discharged from the other side is not the same, the head of the corresponding post is screwed up if the load is overweight and is screwed down if it is underweight until the two halves discharge the same weight. With the post extensions, counterweight, and chute clamped in their adjusted positions the machine may be used indefinitely on that class of material. When another class of material is to be weighed, the flow thereof may be kept the same by adjusting the chute D, and no alteration of the counterweight or posts is required.

I claim—

1. The combination of an automatic weighing-machine, of a counterbalanced weighing-receptacle, a pivoted diaphragm therein, a stationary spout above the receptacle adapted to discharge on either side of the diaphragm according to its position, a pair of toggles for holding said diaphragm in either extreme position, and means brought into action by the descent of the receptacle for releasing the diaphragm.

2. In an automatic weighing-machine, the combination of a counterbalanced weighing-receptacle, a diaphragm pivoted beneath its upper edge in the receptacle, a spout adapted to discharge on either side of the diaphragm according to the latter's position, a pair of toggles carried by the receptacle for holding the diaphragm in either extreme position, and means brought into action by the descent of the receptacle for releasing such holding mechanism.

3. The combination of a counterbalanced weighing-receptacle, a movable diaphragm therein, toggle-links for holding said diaphragm in either extreme position, means brought into action by the descent of the receptacle for buckling the toggle-joint.

4. The combination of a receptacle, a movable diaphragm therein, a pair of toggle members connected with the receptacle and with said diaphragm, each member comprising two links adapted to strengthen to hold the diaphragm in extreme position or to buckle to release it, and a pair of releasing members each adapted to engage a corresponding toggle when the receptacle descends to cause the toggle to buckle.

5. In a weighing-machine, the combination of a weighing-receptacle, a pivoted diaphragm therein, a pair of toggles each connected at one end with the receptacle and at its other end with the diaphragm, and means for breaking the joint of the toggle.

6. In a weighing-machine, the combination of a weighing-receptacle, a diaphragm therein, mechanism for holding said diaphragm in either extreme position, means for releasing said mechanism, and means for moving the same to clear the mechanism.

7. In an automatic weighing-machine, the combination of a weighing-receptacle, a diaphragm therein, mechanism mounted on the receptacle and connected with the diaphragm to hold it in either extreme position, a pair of movable posts adapted to engage said mechanism to release it when the receptacle descends, and means to move either of said posts out of the way when the other is effecting the release.

8. In an automatic weighing-machine, the combination of a receptacle, a pivoted diaphragm therein adapted to swing to bring its lower edge substantially into engagement with either side of the receptacle, a pair of toggles for holding said diaphragm in either of such positions, and mechanism for releasing one toggle or the other when the receptacle descends.

9. In an automatic weighing-machine, the combination of a counterbalanced receptacle, a movable diaphragm therein, mechanism for holding said diaphragm in either of two positions, said mechanism comprising a pair of toggles each connected with the receptacle at one end and with the diaphragm at the other, and a pair of posts, one of which stands beneath the joint of the straightened toggle and is adapted to engage such joint when the receptacle descends.

10. In an automatic weighing-machine, the combination of a receptacle, a pivoted diaphragm therein adapted to swing to bring its lower edge substantially into engagement with either side of the receptacle, mechanism for holding said diaphragm in either of such positions, said mechanism comprising a pair of toggles each connected with the receptacle at one end and with the diaphragm at the other, and a pair of pivoted posts, one of which stands beneath the joint of the straightened toggle and is adapted to engage such joint when the receptacle descends, and a member swinging with the diaphragm to engage the other post to swing it out of the way of the other toggle-joint and allow it to straighten.

11. In an automatic weighing-machine, the combination of a weighing-receptacle, a pivoted diaphragm therein, mechanism for holding the diaphragm in either of two positions, a pair of pivoted posts adapted to engage such mechanism when the receptacle descends to release the diaphragm, said posts being adapted to swing into position by gravity, and means for swinging either post out of such position when the corresponding holding mechanism comes into position.

12. The combination of a weighing-receptacle, discharge-controlling means therefor including a toggle, a post adapted to engage the knuckle of the toggle for actuating such means, said post having an extension screw-threaded to it whereby it may be adjusted toward or from said means.

13. In an automatic weighing-machine, the combination of a weighing-receptacle, a pivoted diaphragm therein, mechanism for holding the diaphragm in either of the two positions, a pair of posts adapted to engage such mechanism to effect its release, each of these posts having an upward extension screw-threaded to it whereby it may be adjusted toward or from the holding mechanism.

14. The combination of a receptacle, a movable diaphragm therein, a pair of toggle members secured to the receptacle and said diaphragm, each member comprising two links adapted to straighten to hold the diaphragm in extreme position or to buckle or release it, a pair of posts each adapted to engage the corresponding toggle when the receptacle descends to cause the toggle to buckle, and means for inedpendently adjusting said posts.

15. The combination of a receptacle, a movable diaphragm, a pair of toggle members for holding it, each member comprising two links adapted to straighten to hold the diaphragm in extreme position or to buckle to release it, a pair of posts each adapted to engage the corresponding toggle when the receptacle descends to cause the toggle to buckle, and means for swinging either of said posts out of the way of the toggle just straightening after the other toggle has been buckled.

16. In an automatic weighing-machine, the combination of a receptacle, a pivoted diaphragm therein adapted to swing to have its lower end substantially engage the receptacle in either of two positions, and a pair of wings carried by the diaphragm above its lower end and adapted to clear the wall of the receptacle when the end of the diaphragm substantially engages such wall.

17. In a weighing-machine, the combination of a weighing-receptacle contracted near its lower end, a diaphragm pivoted above its lower end in the receptacle, said diaphragm being thus adapted to swing to engage the contracted portion of the receptacle on either side, a wing secured on opposite sides of the diaphragm and adapted to stand comparatively close to the wall of the receptacle which the lower end of the diaphragm is engaging while clearing such wall to allow some material to pass the space between the wing and the diaphragm.

18. In an automatic weighing-machine, the combination of a hopper, a stationary spout, an adjustable chute for conveying material from the hopper to the spout, a counterbalanced receptacle located below the spout and having a plurality of chambers, and mechanism connected with said receptacle for presenting alternately different chambers to the spout.

19. In a weighing-machine, the combination of a base, a pair of standards secured thereto, a receptacle, means for supporting and counterbalancing the same, said means being adjustably supported on said standards, and mechanism for causing the receptacle to discharge, said mechanism being also adjustably mounted on said standards.

20. The combination of a base, a pair of standards rising therefrom and adjustably secured thereto, a weighing-receptacle supported by said standards, and mechanism for causing the receptacle to discharge also supported by said standards.

21. The combination of a base, a pair of standards rising therefrom and adjustably secured thereto, a weighing-receptacle supported by said standards, a receiving member, mechanism for causing the receptacle to discharge also supported by said standards, a hopper mechanism above the weighing-receptacle supported by said standards, the hopper mechanism, the support for the weighing-receptacle and the receiving member therefor being all adjustably mounted on said standards.

In testimony whereof I hereunto affix my signature in the presence of two witnesses.

JOSEPH G. RAQUETT.

Witnesses:
ALBERT H. BATES,
G. A. MYERS.